US007653748B2

(12) United States Patent
Borger et al.

(10) Patent No.: US 7,653,748 B2
(45) Date of Patent: Jan. 26, 2010

(54) SYSTEMS, METHODS AND COMPUTER PROGRAM PRODUCTS FOR INTEGRATING ADVERTISING WITHIN WEB CONTENT

(75) Inventors: Dana Borger, Cary, NC (US); Steve Cox, Durham, NC (US); Tom Gordon, New York, NY (US); David Spitz, Raleigh, NC (US); Matthew Squire, Raleigh, NC (US); Jay Thrash, Raleigh, NC (US)

(73) Assignee: Simplexity, LLC, Philadelphia, PA (US)

( * ) Notice: Subject to any disclaimer, the term of this patent is extended or adjusted under 35 U.S.C. 154(b) by 320 days.

(21) Appl. No.: 09/922,348

(22) Filed: Aug. 3, 2001

(65) Prior Publication Data

US 2002/0062393 A1 May 23, 2002

Related U.S. Application Data

(60) Provisional application No. 60/224,152, filed on Aug. 10, 2000.

(51) Int. Cl.
*G06F 15/16* (2006.01)
(52) U.S. Cl. .................. 709/246; 709/217; 709/219; 704/2; 704/7; 715/249; 455/414.4
(58) Field of Classification Search ................. 345/727; 704/270, 260, 2, 7; 709/218, 246, 217; 705/10; 455/414.4; 715/249
See application file for complete search history.

(56) References Cited

U.S. PATENT DOCUMENTS

| 5,664,948 | A | * | 9/1997 | Dimitriadis et al. ...... 434/307 R |
| 5,732,216 | A | * | 3/1998 | Logan et al. ................ 709/203 |
| 5,796,952 | A | * | 8/1998 | Davis et al. ................. 709/224 |
| 5,832,432 | A | * | 11/1998 | Trader et al. ............... 704/260 |
| 5,893,091 | A | * | 4/1999 | Hunt et al. ..................... 707/3 |
| 5,937,162 | A | * | 8/1999 | Funk et al. .................. 709/206 |
| 6,018,710 | A | * | 1/2000 | Wynblatt et al. ............ 704/260 |
| 6,199,076 | B1 | * | 3/2001 | Logan et al. ............. 715/501.1 |
| 6,269,336 | B1 | * | 7/2001 | Ladd et al. .................. 704/270 |

(Continued)

FOREIGN PATENT DOCUMENTS

WO        WO 0211120 A1 *  2/2002

*Primary Examiner*—Dohm Chankong
(74) *Attorney, Agent, or Firm*—Patton Boggs LLP

(57) ABSTRACT

Systems, methods, and computer program products that facilitate the integration and accounting of advertising within audio Web content requested by users via telephone devices are provided. Upon receiving a request from a user for Web content via a telephone device, a Web server retrieves an advertisement from an advertisement server, inserts the retrieved advertisement within the user requested Web content, and forwards the user requested Web content and advertisement to a text-to-speech transcoder for conversion to an audio format. The text-to-speech transcoder converts the Web content and advertisement from a text-based format to an audio format and serves the Web content and advertisement in the audio format to the user client device via a telephone link established with the user client device. If an advertisement is interactive, a text-to-speech transcoder may be configured to notify an advertisement server of user interaction with the advertisement. Information such as an identification of a requesting client device, user, as well as time and date information, may be recorded by an advertisement server for use in measuring effectiveness of a particular marketing and/or advertising campaign. Information associated with providing a user with additional information associated with an advertisement may also be stored.

38 Claims, 4 Drawing Sheets

U.S. PATENT DOCUMENTS

| | | | |
|---|---|---|---|
| 6,335,928 B1 * | 1/2002 | Herrmann et al. | 370/352 |
| 6,349,132 B1 * | 2/2002 | Wesemann et al. | 379/88.17 |
| 6,426,956 B1 * | 7/2002 | Eteminan | 370/401 |
| 6,446,041 B1 * | 9/2002 | Reynar et al. | 704/260 |
| 6,449,343 B1 * | 9/2002 | Henderson | 379/88.14 |
| 6,501,832 B1 * | 12/2002 | Saylor et al. | 379/88.04 |
| 6,507,817 B1 * | 1/2003 | Wolfe et al. | 704/260 |
| 6,587,547 B1 * | 7/2003 | Zirngibl et al. | 379/88.17 |
| 6,728,934 B1 * | 4/2004 | Scopes | 715/513 |
| 6,792,086 B1 * | 9/2004 | Saylor et al. | 379/88.17 |
| 6,798,867 B1 * | 9/2004 | Zirngibl et al. | 379/88.17 |
| 6,807,574 B1 * | 10/2004 | Partovi et al. | 709/224 |
| 6,836,792 B1 * | 12/2004 | Chen | 709/220 |
| 6,842,767 B1 * | 1/2005 | Partovi et al. | 709/203 |
| 6,874,017 B1 * | 3/2005 | Inoue et al. | 709/217 |
| 6,874,018 B2 * | 3/2005 | Wu | 709/219 |
| 6,941,273 B1 * | 9/2005 | Loghmani et al. | 705/26 |
| 6,970,915 B1 * | 11/2005 | Partovi et al. | 709/217 |
| 7,116,765 B2 * | 10/2006 | Summers et al. | 379/88.17 |
| 7,174,297 B2 * | 2/2007 | Guerra et al. | 704/270.1 |
| 7,509,178 B2 * | 3/2009 | Logan et al. | 700/94 |
| 2001/0033564 A1 * | 10/2001 | Hickman | 370/352 |
| 2001/0047517 A1 * | 11/2001 | Christopoulos et al. | 725/87 |
| 2001/0048676 A1 * | 12/2001 | Jimenez et al. | 370/352 |
| 2001/0054085 A1 * | 12/2001 | Kurganov | 709/218 |
| 2002/0003547 A1 * | 1/2002 | Wang et al. | 345/727 |
| 2002/0006124 A1 * | 1/2002 | Jimenez et al. | 370/352 |
| 2002/0022999 A1 * | 2/2002 | Shuster et al. | 705/14 |
| 2002/0035474 A1 * | 3/2002 | Alpdemir | 704/270 |
| 2002/0052747 A1 * | 5/2002 | Sarukkai | 704/270 |
| 2002/0052781 A1 * | 5/2002 | Aufricht et al. | 705/14 |
| 2002/0095330 A1 * | 7/2002 | Berkowitz et al. | 705/14 |
| 2002/0129067 A1 * | 9/2002 | Dames et al. | 707/523 |
| 2003/0135412 A1 * | 7/2003 | Speicher | 705/14 |
| 2003/0212759 A1 * | 11/2003 | Wu | 709/218 |

* cited by examiner

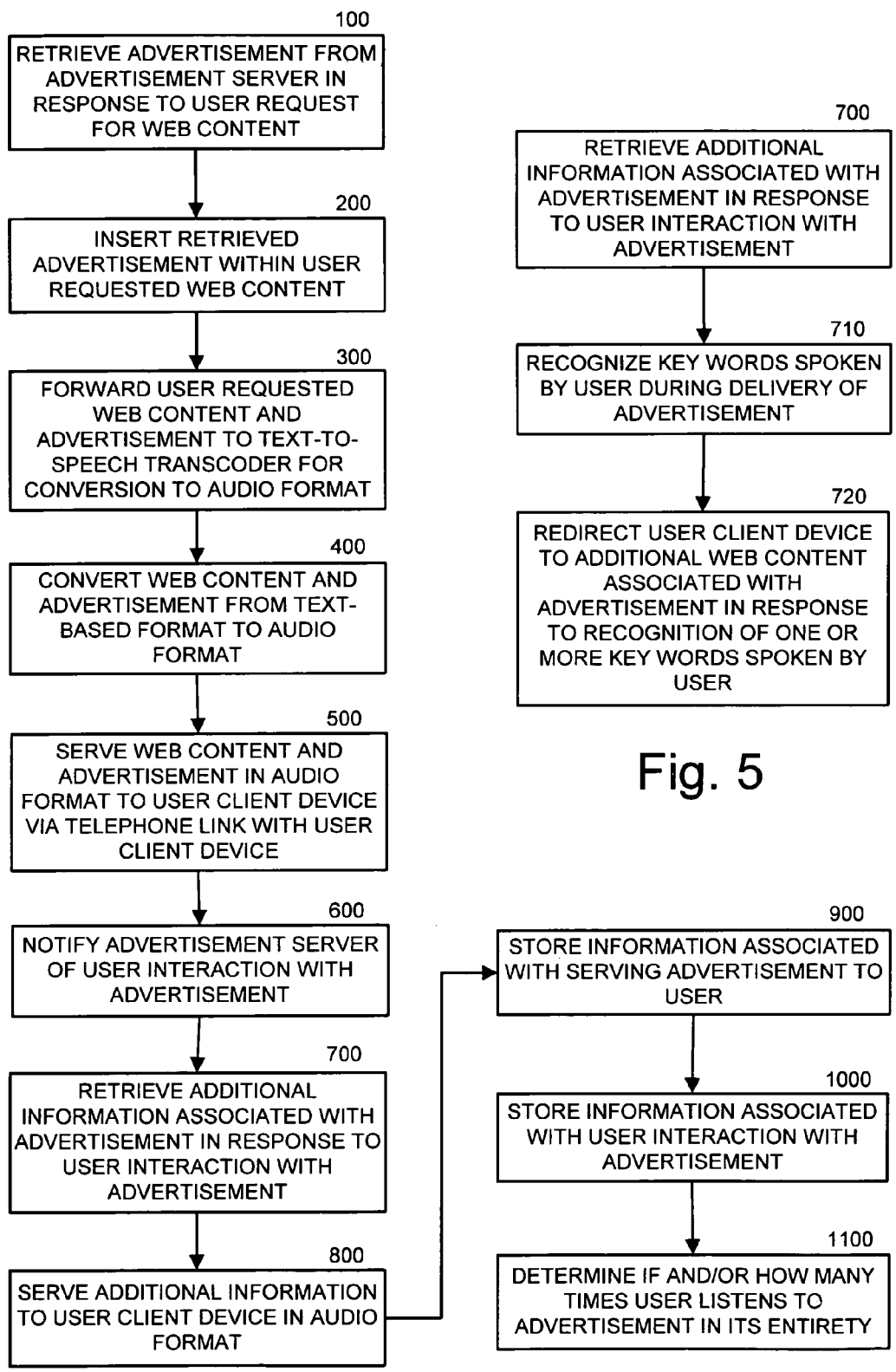

SYSTEMS, METHODS AND COMPUTER PROGRAM PRODUCTS FOR INTEGRATING ADVERTISING WITHIN WEB CONTENT

RELATED APPLICATIONS

This application claims the benefit of U.S. Provisional Application No. 60/224,152, filed Aug. 10, 2000.

FIELD OF THE INVENTION

The present invention relates generally to communications networks and, more particularly, to advertising via communications networks.

BACKGROUND OF THE INVENTION

The Internet has gained broad recognition and acceptance as a viable medium for communicating and for conducting business. The World-Wide Web (Web) is comprised of server-hosting computers (Web servers) connected to the Internet that have hypertext documents (referred to as Web pages) stored therewithin. Web pages are accessible by client programs (e.g., Web browsers) utilizing the Hypertext Transfer Protocol (HTTP) via a Transmission Control Protocol/Internet Protocol (TCP/IP) connection between a client-hosting device and a server-hosting device. While HTTP and Web pages are the prevalent forms for the Web, the Web itself refers to a wide range of protocols and Web content formats.

With the increasing mobility of today's society, the demand for mobile computing capabilities has also increased. Many workers and professionals are downsizing their laptop computers to smaller hand-held devices, such as personal digital assistants (PDAs). In addition, many people now utilize wireless devices, such as cellular telephones, to access the Internet and to perform various other computing functions. Wireless devices may include, but are not limited to, PDAs, cellular telephones, pagers, and communicators. Many wireless devices also utilize the Microsoft® Windows® CE and 3Com Palm® Computing platforms. With the advent and development of wireless telecommunications systems and technologies, wireless Internet access is increasing worldwide.

As the Web has evolved into a viable commercial medium, advertising has become an important source of revenue for many entities. Web pages served from Web sites may utilize advertising to promote various goods and services. For many conventional wireless devices, Web content is displayed as a sequence of displays (cards). To subsidize costs, wireless content publishers may use advertisements mixed with content, often as interstitial displays within a sequence of content displays.

Conventionally, advertisements are served from an advertisement server, as illustrated in prior art FIG. 1. A browser executing within a client device 10 requests an advertisement from an advertisement server 20, represented by A. The advertisement server 20 returns the advertisement to the client device for insertion within a displayed Web page, represented by B. When a user clicks on the displayed advertisement, a request is sent to the advertisement server 20, represented by C. In response, the advertisement server 20 returns a redirection directive associated with a third party advertiser to the browser, represented by D. The browser follows the redirection to a Web site of the advertiser 25, represented by E, wherein additional details and/or information can be obtained, represented by F.

One of the primary functions of an advertisement server is to store (and allow retrieval of) information on the effectiveness of a given advertising campaign (referred to as "accounting"). The effectiveness of advertising via the Internet is conventionally measured by monitoring the "click-through" rate associated with advertising. A "click-through" event occurs when a user interacts with an advertisement displayed within a Web page by "clicking" on the advertisement (e.g., via a mouse or other input device). Conventionally, an advertisement server is notified when an advertisement is served, and when a user clicks on the advertisement. These advertisement servers typically maintain statistics on how many times advertisements have been served, how many times they have been "clicked-on", etc., even if advertisements are served from multiple sites in multiple domains.

"Voice portals", which allow access to the Internet via telephone, are becoming increasingly popular. Utilizing speaker-independent speech recognition and text-to-speech technologies, voice portals can be accessed via wireless and wireline telephones and can allow users to "verbally" surf the web and make transactions (e.g., purchase airline tickets). Voice Extensible Markup Language (VXML) allows a user to interact with the Internet through voice-recognition technology. Instead of a traditional browser that relies on a combination of HTML and keyboard and/or mouse, VXML relies on a voice browser and/or the telephone. Using VXML, a user interacts with a voice browser by listening to audio output that is either pre-recorded or computer-synthesized and then submitting audio input either by voice or by keypad.

As with the visually browsed Internet, voice portals are expected to generate revenue by selling advertising "space" on their sites. Advertising space for a voice portal relates to audio advertisements interspersed with content. Thus, when "listening to the Web", a user might hear advertisements similar to those conventionally heard via radio.

Unfortunately, delivery, management, and accounting for audio advertisements may be difficult via conventional advertisement server systems. In addition, audio advertisements may not be capable of interacting with conventional Internet advertising. As such, a need exists for integrating audio advertisements with conventional advertisement server systems and for allowing interaction with audio advertisements.

SUMMARY OF THE INVENTION

In view of the above, the present invention provides systems, methods, and computer program products that can facilitate the integration and accounting of advertising within audio Web content requested by users via telephone devices. Upon receiving a request from a user for Web content via a telephone device, a Web server retrieves an advertisement from an advertisement server, inserts the retrieved advertisement within the user requested Web content (i.e., within a VXML document(s) representative of the Web content), and forwards the user requested Web content and advertisement to a text-to-speech transcoder for conversion to an audio format. The text-to-speech transcoder converts the Web content and advertisement from a text-based format to an audio format and serves the Web content and advertisement in the audio format (i.e., as an audio stream) to the user client device via a telephone link established with the user client device.

According to embodiments of the present invention, if an advertisement is configured to be interactive, a text-to-speech transcoder may be configured to notify an advertisement server of user interaction with the advertisement. For example, user interaction with the advertisement (i.e., by pressing a key on a keypad during the advertisement and/or by speaking one or more recognizable words and/or phrases) is recorded by an advertisement server. Moreover, information such as, but not limited to, an identification of the requesting client device, user, and time and date information, may be recorded by an advertisement server for use in measuring effectiveness of a particular advertising campaign. Information associated with providing a user with additional information associated with an advertisement may also be stored.

According to embodiments of the present invention, a text-to-speech transcoder may be configured to retrieve additional information associated with an advertisement in response to user interaction therewith and deliver the additional information to a user client device in an audio format. For example, a text-to-speech transcoder may be configured to recognize key words spoken by the user during delivery of an advertisement. In response to recognizing one or more key words spoken by the user, a text-to-speech transcoder may be configured to redirect the user client device to additional Web content associated with the advertisement (e.g., to another Web site). According to embodiments of the present invention, additional information may be retrieved from (or via) an advertisement server and delivered to a user client device.

An advertisement server according to embodiments of the present invention may be configured to store information associated with serving an advertisement to a user, as well as information associated with user interaction with an advertisement. According to additional embodiments of the present invention, an advertisement server may be configured to determine if and/or how many times a user listens to an advertisement.

BRIEF DESCRIPTION OF THE DRAWINGS

FIGS. 4-5 are flowcharts that illustrate operations for integrating interactive advertising within audio Web content according to embodiments of the present invention.

DETAILED DESCRIPTION OF THE INVENTION

Figure 1:
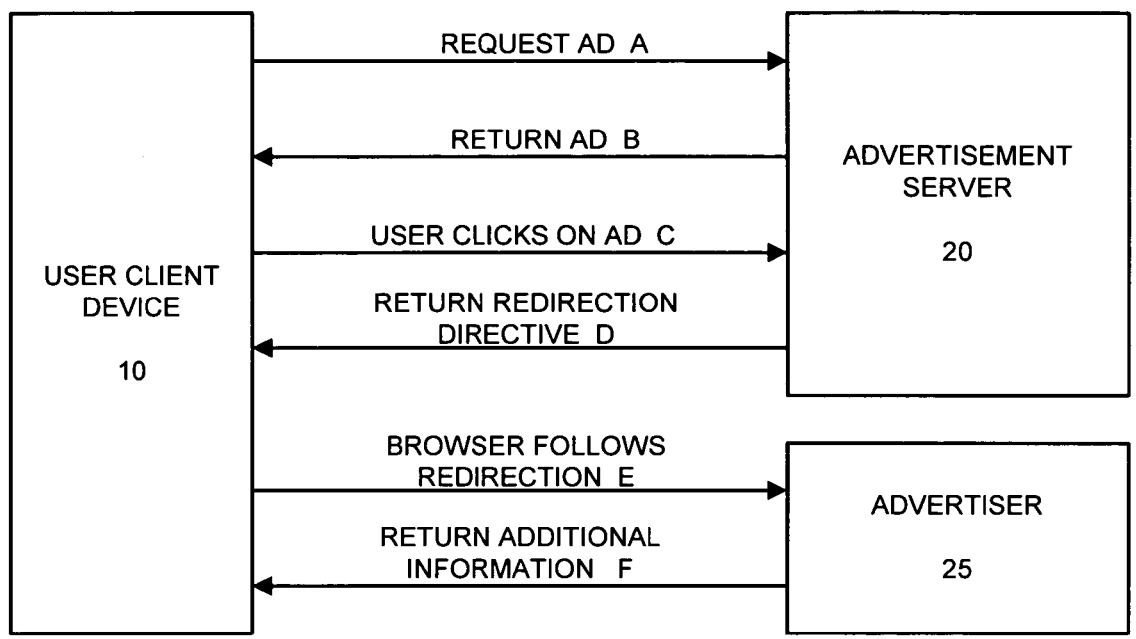
FIG. 1 is a block diagram that illustrates how advertisements are served from a conventional advertisement server.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As also will be appreciated by one of skill in the art, the present invention may be embodied as methods, data processing systems, and/or computer program products. Accordingly, the present invention may take the form of an entirely hardware embodiment, an entirely software embodiment running on general purpose hardware or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language (e.g., JAVA®, Smalltalk or C++) and/or may also be written in a conventional procedural programming language (e.g., "C"). However, software embodiments of the present invention do not depend on implementation with a particular programming language. Program code may execute entirely on one or more server computer systems.

The present invention is described below with reference to block diagram and flowchart illustrations of methods, apparatus (systems) and computer program products according to embodiments of the invention. It will be understood that each block of the block diagrams and/or flowchart illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create structures for implementing the functions specified in the block diagram and/or flowchart block or blocks. Each block, and combinations of blocks, can be implemented by servers which perform the specified functions or steps, or combinations of special purpose hardware and computer instructions.

These computer program instructions may also be stored in a computer-readable memory that can direct a computer or other programmable data processing apparatus to function in a particular manner, such that the instructions stored in the computer-readable memory produce an article of manufacture including instructions which implement the function specified in the block diagram and/or flowchart block or blocks.

The computer program instructions may also be loaded onto a computer or other programmable data processing apparatus to cause a series of operational steps to be performed on the computer or other programmable apparatus to produce a computer implemented process or method such that the instructions which execute on the computer or other programmable apparatus provide steps for implementing the functions specified in the block diagram and/or flowchart block or blocks.

It should be noted that, in some alternative embodiments of the present invention, the functions noted in the blocks may occur out of the order noted in the figures. For example, two blocks shown in succession may in fact be executed substantially concurrently or the blocks may sometimes be executed in the reverse order, depending on the functionality involved. Furthermore, in certain embodiments of the present invention, such as object oriented programming embodiments, the sequential nature of the flowcharts may be replaced with an object model such that operations and/or functions may be performed in parallel or sequentially.

Figure 2:
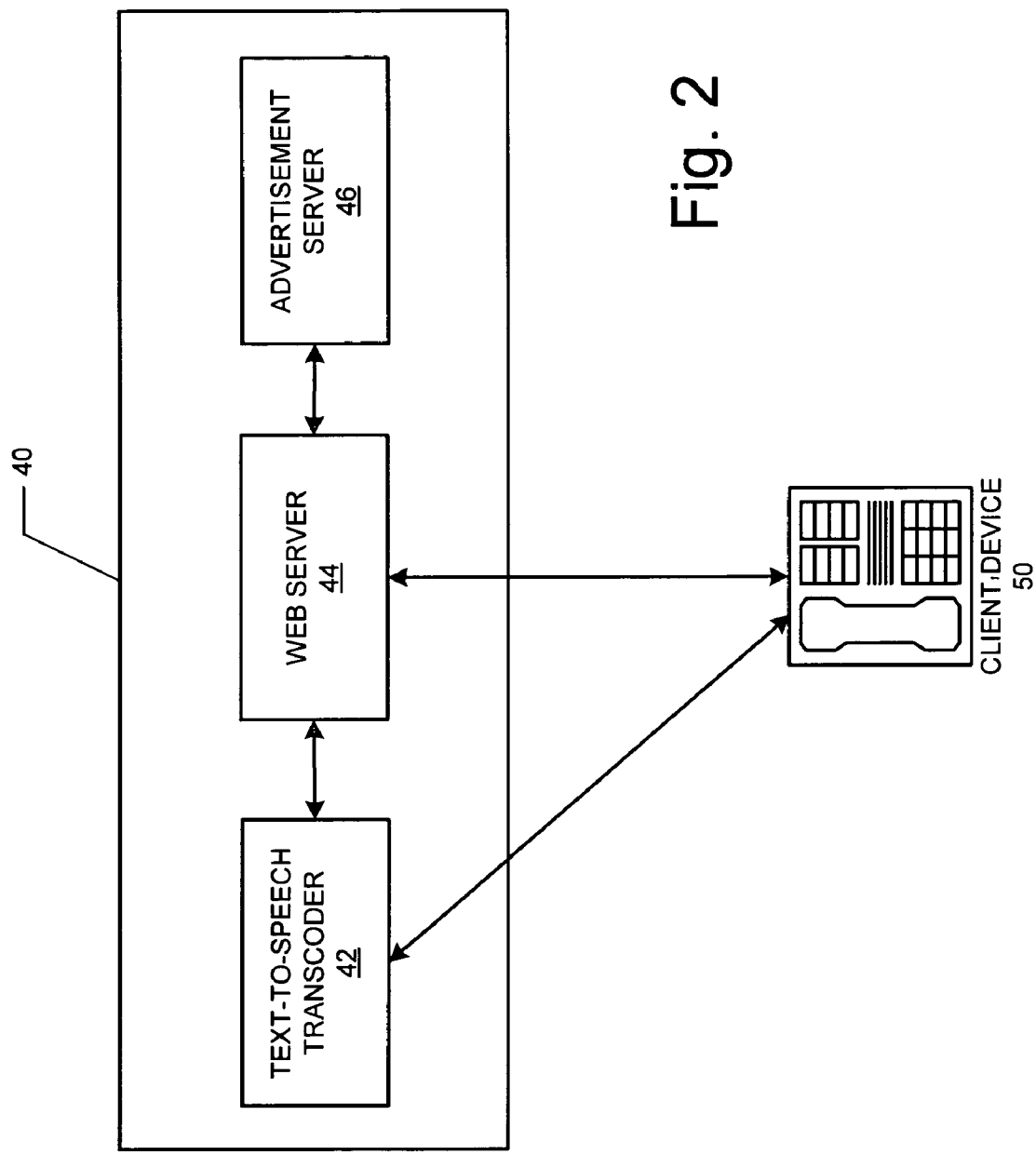
FIG. 2 is a block diagram that illustrates a computer system according to embodiments of the present invention that is configured to integrate interactive advertising within audio Web content requested by users.

Referring to FIG. 2, a computer system 40 configured to integrate interactive advertising within Web content requested by users via client devices 50 (e.g., wireline and/or wireless telephone devices), according to embodiments of the present invention, is illustrated. The illustrated computer system 40 includes a text-to-speech transcoder 42 that is configured to convert Web content (including advertisements) from a text-based format (e.g., VXML format) to an audio format, a Web server 44 that hosts Web content, and an advertisement server 46 that provides advertisements for insertion within Web content delivered in response to user requests. The textto-speech transcoder 42, Web server 44, and advertisement server 46 may be implemented via a single data processing device or via multiple data processing devices. Moreover, the text-to-speech transcoder 42, Web server 44, and advertisement server 46 may be implemented via remotely located data processing devices.

Figure 3:
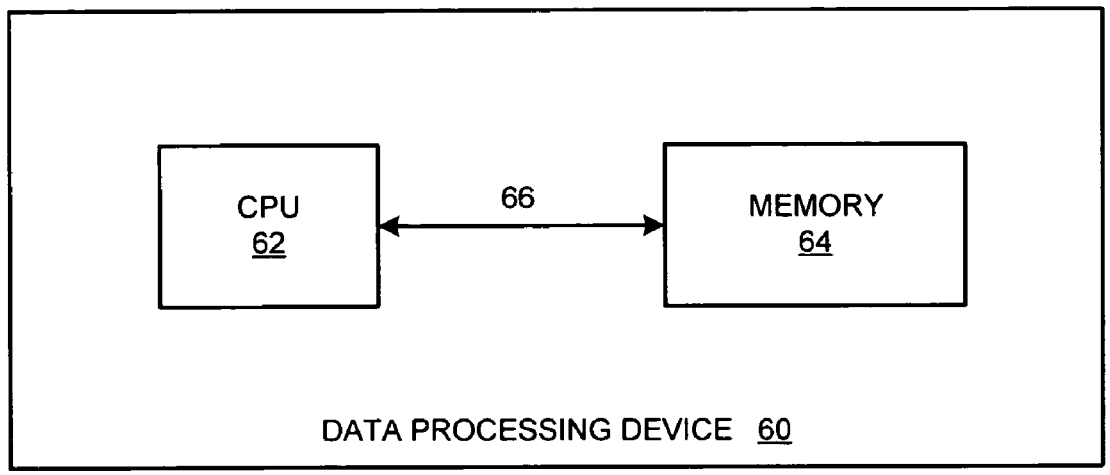
FIG. 3 is a block diagram that illustrates an exemplary data processing device upon which embodiments of the present invention may be implemented or practiced.

FIG. 3 is a block diagram that illustrates an exemplary data processing device 60 upon which embodiments of the present invention may be implemented or practiced. A separate data processing device 60 may be used to implement the text-to-speech transcoder 42, Web server 44, and advertisement server 46. Alternatively, two or more of the text-to-speech transcoder 42, Web server 44, and advertisement server 46 may be implemented via a single data processing device 60.

The illustrated data processing device 60 includes a central processor (CPU) 62 and memory 64. The memory 64 is configured to store computer program instructions to be executed by the CPU 62 for performing the process steps represented by the block diagrams and flow charts of FIG. 2 and FIGS. 4-5. The CPU 62 communicates with the memory 64 via an address/data bus 66.

The CPU 62 may be, for example, a commercially available or custom microprocessor. The memory 64 is representative of the overall hierarchy of memory devices containing software and data used to facilitate and account for call-through advertising between third party advertisers and users of Web-enabled telephone devices in accordance with embodiments of the present invention. The memory 64 may store other information and software such as applications programs, network communication programs (e.g., TCP/IP protocol), operating system software, server software, such as HTTP server software, etc. The memory 64 may include, but is not limited to, the following types of devices: cache, ROM, PROM, EPROM, EEPROM, flash, SRAM, and DRAM.

Referring back to FIG. 2, the Web server 44 hosts Web content in a text-based format, such as VXML. The Web server 44 is configured to retrieve (i.e., request) an advertisement from the advertisement server 46 and insert the retrieved advertisement within user requested Web content. The Web server 44 is also configured to forward the user requested Web content and advertisement to the text-to-speech transcoder 42 for conversion to an audio format and subsequent delivery to a user client device 50 as an audio stream.

The text-to-speech transcoder 42 is configured to convert Web content, and advertisements inserted therewithin, from a text-based format, such as VXML, to an audio format. The text-to-speech transcoder 42 is configured to serve the transcoded Web content (including advertisements) in an audio format to a user client device 50 (e.g., a telephone) via a telephone link with the user client device 50. For advertisements that are configured to be interactive, the text-to-speech transcoder 42 may be configured to notify the advertisement server 46 of user interaction therewith.

According to embodiments of the present invention, the text-to-speech transcoder 42 is configured to retrieve additional information associated with an advertisement in response to user interaction with the advertisement, and to deliver the additional information to the user client device 50 in an audio format. Additional information associated with an advertisement may be retrieved from the advertisement server 46 or from another source. According to embodiments of the present invention, the text-to-speech transcoder 42 is configured to recognize one or more key words spoken by a user during delivery of an advertisement to the user's client device 50. The text-to-speech transcoder 42 is configured to redirect the user client device to additional audio content associated with the advertisement in response to recognition of one or more key words spoken by the user.

According to embodiments of the present invention, the advertisement server 46 is configured to select advertisements for insertion within user-requested Web content based upon the requested Web content, and/or based upon information associated with the requesting user. In addition, the advertisement server 46 may be configured to select advertisements for insertion within user-requested Web content having a format and size (e.g. a predetermined time length) compatible with user-requested Web content when the Web content is converted to an audio format. For example, user-requested Web content may be configured to include an advertisement having a length of thirty (30) seconds when converted to audio format. Accordingly, the advertisement server 46 selects one or more advertisements that collectively do not exceed the thirty (30) second parameter.

According to embodiments of the present invention, the advertisement server 46 may be configured to store information associated with user interaction with an advertisement. In addition, the advertisement server 46 may be configured to determine if a user listened to an advertisement in its entirety and/or determine how many times a user listens to an advertisement.

Users receiving advertising and Web content in audio format in accordance with embodiments of the present invention may communicate with the Web server 44 and text-to-speech transcoder 42 via any type of wireline and wireless telephone device. Exemplary telephone devices include, but are not limited to, personal computers with modems and/or radiotelephone capabilities, portable computers with modems and/or radiotelephone capabilities, handheld computers with modems and/or radiotelephone capabilities, personal digital assistants (PDAs) with modems and/or radiotelephone capabilities, pagers, cellular telephones, web phones, web-enabled radiotelephones, and other mobile/wireless devices.

Referring now to FIG. 4, operations for integrating advertising within Web content requested by users according to embodiments of the present invention are illustrated. Upon receiving a request from a user for Web content via a telephone device, a Web server 44 retrieves an advertisement from an advertisement server 46 (Block 100). The Web content and advertisement have a text-based format (e.g., VXML) and the advertisement may be configured to be interactive when converted to an audio format with the Web content. The Web server 44 inserts the retrieved advertisement within the user requested Web content (i.e., within one or more VXML documents representative of the Web content) (Block 200), and forwards the user requested Web content and advertisement in the VXML document(s) to a text-to-speech transcoder 42 for conversion to an audio format (Block 300). The text-to-speech transcoder 42 converts the Web content and advertisement from a text-based format to an audio format (Block 400) and serves the Web content and advertisement in the audio format (i.e., as an audio stream) to the user client device via a telephone link established with the user client device (Block 500).

If the advertisement is configured to be interactive, the text-to-speech transcoder 42 notifies the advertisement server 46 of user interaction with the advertisement (Block 600). For example, the user's interaction with the advertisement (i.e., pressing a key on a keypad during the advertisement and/or speaking one or more recognizable words and/or phrases) is recorded by the advertisement server. Moreover, information such as, but not limited to, an identification of the requesting client device, user, and time and date information, etc., may be recorded by the advertisement server for use in measuring effectiveness of a particular advertising campaign. Information associated with providing a user with additional information associated with an advertisement may also be stored.

According to embodiments of the present invention, the text-to-speech transcoder 42 may retrieve additional information associated with the advertisement in response to user interaction with an interactive advertisement (Block 700) and deliver the additional information to the user client device in an audio format (Block 800). For example, a text-to-speech transcoder 42 may be configured to recognize key words spoken by the user during delivery of an advertisement (Block 710, FIG. 5). In response to recognizing one or more key words spoken by the user, the text-to-speech transcoder 42 may be configured to redirect the user client device to additional Web content associated with the advertisement (e.g., to another Web site) (Block 720, FIG. 5). According to embodiments of the present invention, additional information may retrieved from (or via) the advertisement server 46 and delivered to the user client device.

Still referring to FIG. 4, the advertisement server 46 may be configured to store information associated with serving an advertisement to a user (Block 900). In addition, the advertisement server 46 may store information associated with user interaction with an advertisement. According to additional embodiments of the present invention, the advertisement server 46 may be configured to determine if and/or how many times a user listens to an advertisement (Block 1100).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A computer system configured to integrate advertising within user-requested Web content, comprising:
    an advertisement server that hosts advertisements in a text-based format, the advertisement server comprising:
        means for selecting a plurality of aggregated advertisements having a format and size compatible with the user-requested Web content when the user-requested Web content is converted to an audio format for insertion within the user-requested Web content in response to a request for Web content, wherein the means for selecting the plurality of aggregated advertisements having a format and size compatible with user-requested Web content comprises means for retrieving the plurality of aggregated advertisements having a predetermined time length when delivered in an audio format;
    a text-to-speech transcoder, comprising:
        means for converting Web content from a text-based format to an audio format content prior to streaming the audio format content to a user client device; and
        means for serving Web content in an audio format to the user client device via a telephone link with the user client device; and
    a Web server that hosts Web content in a text-based format, comprising:
        means, responsive to a user request via the client device for Web content, for retrieving an advertisement from the advertisement server, in response to the subject matter of the Web content;
        means for inserting the retrieved advertisements within the user requested Web content; and
        means for forwarding the user requested Web content and advertisement to the text-to-speech transcoder for conversion to an audio format and subsequent delivery to the user client device.

2. The computer system of claim 1, wherein the text-based format comprises voice extensible markup language (VXML) format.

3. The computer system of claim 1, wherein the advertisement server further comprises means for storing information associated with serving an advertisement to a user.

4. The computer system of claim 1, wherein the advertisement server further comprises means for determining if a user listened to an advertisement in its entirety.

5. The computer system of claim 1, wherein the advertisement server further comprises means for determining how many times a user listened to an advertisement.

6. A computer system configured to integrate interactive advertising within user-requested Web content, the computer system comprising:
    an advertisement server that hosts advertisements in a text-based format, wherein the advertisements are interactive when converted to an audio format comprising:
        means for selecting a plurality of aggregated advertisements having a format and size compatible with the user-requested Web content when the user-requested Web content is converted to an audio format for insertion within the user-requested Web content in response to a request for Web content, wherein the means for selecting the plurality of aggregated advertisements having a format and size compatible with user-requested Web content comprises means for retrieving the plurality of aggregated advertisements having a predetermined time length when delivered in an audio format;
    means for storing information associated with user interaction with an advertisement;
    a text-to-speech transcoder, comprising:
        minor matter of form with respect to means for serving Web content in an audio format to the user client device via a telephone link with the user client device;
        means for notifying the advertisement server of user interaction with an advertisement;
        means for retrieving additional information associated with the advertisement in response to user interaction with the advertisement, wherein the user interaction comprises recognizing a key pressed on a keypad or one or more key words spoken by a user during delivery of an advertisement;
        means for delivering the additional information to the user client device in an audio format; and
    a Web server that hosts Web content in a text-based format, comprising:
        means, responsive to a user request via the client device for Web content, for retrieving an advertisement from the advertisement server in response to the subject matter of the Web content;
        means for inserting the retrieved advertisement within the user requested Web content; and
        means for forwarding the user requested Web content and advertisement to the text-to-speech transcoder for conversion to an audio format and subsequent delivery to the user client device.

7. The computer system of claim 6, wherein the text-to-speech transcoder further comprises:
means for redirecting the user client device to additional audio content associated with the advertisement in response to recognition of one or more key words spoken or pressing of a key on a keypad by the user.

8. The computer system of claim 6, wherein the means for retrieving additional information associated with an advertisement in response to user interaction with the advertisement comprises means for retrieving additional information from the advertisement server.

9. The computer system of claim 6, wherein the text-based format comprises voice extensible markup language (VXML) format.

10. The computer system of claim 6, wherein the advertisement server further comprises means for determining if a user listened to an advertisement in its entirety.

11. The computer system of claim 6, wherein the advertisement server further comprises means for determining how many times a user listened to an advertisement.

12. A system for integrating advertising within user-requested Web content, the system comprising:
a server accessible by a user client device via a telephone link, wherein the server performs a method comprising:
retrieving a plurality of aggregated advertisements having a format and size compatible with the user-requested Web content when the user-requested Web content is converted to an audio format-from an advertisement server in response to the subject matter of the Web content and in response to a user request for Web content received by a Web server from a client device, wherein the Web content and advertisement have a text-based format, wherein retrieving the plurality of aggregated advertisements having a format and size compatible with user-requested Web content comprises retrieving the plurality of aggregated advertisements having a predetermined time length when delivered in an audio format;
inserting the retrieved advertisement within the user requested Web content;
forwarding the user requested Web content and advertisement to a text-to-speech transcoder for conversion to an audio format prior to streaming the audio format content to the user client device;
converting the Web content and advertisement from a text-based format to an audio format; and
serving the Web content and advertisement in an audio format to the user client device via a telephone link with the user client device.

13. The system of claim 12, wherein the text-based format comprises voice extensible markup language (VXML) format.

14. The system of claim 12, further comprising storing information associated with serving the advertisement to the user.

15. The system of claim 12, further comprising determining if a user listened to the advertisement in its entirety.

16. The system of claim 12, further comprising determining how many times the user listened to the advertisement.

17. A system for integrating interactive advertising within user-requested Web content, the system comprising:
a plurality of servers accessible by a user client device via a telephone link, wherein the servers perform a method comprising:
retrieving a plurality of aggregated advertisements having a format and size compatible with the user-requested Web content when the user-requested Web content is converted to an audio format from an advertisement server in response to a user request for Web content received by a Web server from a client device and in response to the subject matter of the Web content, wherein the Web content and advertisement have a text-based format, and wherein the advertisement is configured to be interactive when converted to an audio format, wherein retrieving the plurality of aggregated advertisements having a format and size compatible with user-requested Web content comprises retrieving the plurality of aggregated advertisements having a predetermined time length when delivered in an audio format;
inserting the retrieved advertisement within the user requested Web content;
forwarding the user requested Web content and advertisement to a text-to-speech transcoder for conversion to an audio format prior to streaming the audio format content to the user client device;
converting the Web content and advertisement from a text-based format to an audio format;
serving the Web content and advertisement in an audio format to the user client device via a telephone link with the user client device;
storing information associated with user interaction with an advertisement;
notifying the advertisement server of user interaction with the advertisement retrieving additional information associated with the advertisement in response to user interaction with the advertisement wherein the user interaction comprises recognizing a key pressed on a keypad or one or more key words spoken by a user during delivery of an advertisement; and
delivering the additional information to the user client device in an audio format.

18. The system of claim 17, further comprising:
redirecting the user client device to additional Web content associated with the advertisement in response to recognition of one or more key words spoken or pressing of a key on a keypad by the user.

19. The system of claim 17, wherein retrieving additional information associated with the advertisement in response to user interaction with the advertisement comprises retrieving additional information from the advertisement server.

20. The system of claim 17, wherein the text-based format comprises voice extensible markup language (VXML) format.

21. The system of claim 17, further comprising storing information associated with serving the advertisement to the user.

22. The system of claim 17, further comprising determining if a user listened to the advertisement in its entirety.

23. The system of claim 17, further comprising determining how many times the user listened to the advertisement.

24. A computer program product that integrates advertising within user-requested Web content, the computer program product comprising a computer usable storage medium having computer readable program code embodied in the medium, the computer readable program code comprising:
computer readable program code that is configured to retrieve a plurality of aggregated advertisements having a format and size compatible with the user-requested Web content when the user-requested Web content is converted to an audio format from an advertisement server in response to a user request for Web content received by a Web server from a client device and in response to the subject matter of the Web content, wherein the Web content and advertisement have a text-based format, wherein the computer readable program code that is configured to retrieve the plurality of aggregated advertisements having a format and size compatible with user-requested Web content comprises computer readable program code that is configured to retrieve the plurality of aggregated advertisements having a predetermined time length when delivered in an audio format;

computer readable program code that is configured to insert the retrieved advertisement within the user requested Web content;

computer readable program code that is configured to forward the user requested Web content and advertisement to a text-to-speech transcoder for conversion to an audio format prior to streaming the audio format content to the user client device;

computer readable program code that is configured to convert the Web content and advertisement from a text-based format to an audio format; and computer readable program code that is configured to serve the Web content and advertisement in an audio format to the user client device via a telephone link with the user client device.

25. The computer program product of claim 24, wherein the text-based format comprises voice extensible markup language (VXML) format.

26. The computer program product of claim 24, further comprising computer readable program code that is configured to store information associated with serving the advertisement to the user.

27. The computer program product of claim 24, further comprising computer readable program code that is configured to determine if a user listened to the advertisement in its entirety.

28. The computer program product of claim 24, further comprising computer readable program code that is configured to determine how many times the user listened to the advertisement.

29. A computer program product that integrates interactive advertising within user-requested Web content, the computer program product comprising a computer usable storage medium having computer readable program code embodied in the medium, the computer readable program code comprising:

computer readable program code that is configured to retrieve a plurality of aggregated advertisements having a format and size compatible with the user-requested Web content when the Web content is converted to an audio format from an advertisement server in response to a user request for Web content received by a Web server from a client device and in response to the subject matter of the Web content, wherein the Web content and advertisement have a text-based format, and wherein the advertisement is configured to be interactive when converted to an audio format, wherein the computer program code that is configured to retrieve the plurality of aggregated advertisements having a format and size compatible with user-requested Web content comprises computer readable storage program code that is configured to retrieve the plurality of aggregated advertisements having a predetermined time length when delivered in an audio format;

computer readable program code that is configured to insert the retrieved advertisement within the user requested Web content prior to streaming the audio format content to the user client device;

computer readable program code that is configured to forward the user requested Web content and advertisement to a text-to-speech transcoder for conversion to an audio format;

computer readable program code that is configured to convert the Web content and advertisement from a text-based format to an audio format;

computer readable program code that is configured to serve the Web content and advertisement in an audio format to the user client device via a telephone link with the user client device;

computer readable program code that is configured to store information associated with user interaction with an advertisement;

computer readable program code that is configured to notify the advertisement server of user interaction with the advertisement computer readable program code that is configured to retrieve additional information associated with an advertisement in response to user interaction with the advertisement, wherein the user interaction comprises recognizing a key pressed on a keypad or one or more key words spoken by a user during delivery of an advertisement; and computer readable program code that is configured to deliver the additional information to the user client device in an audio format.

30. The computer program product of claim 29, further comprising:

computer readable program code that is configured to redirect the user client device to additional Web content associated with the advertisement in response to recognition of one or more key words spoken or pressing of a key on a keypad by the user.

31. The computer program product of claim 29, wherein the computer readable program code that is configured to retrieve additional information associated with the advertisement in response to user interaction with the advertisement comprises computer readable program code that is configured to retrieves additional information from the advertisement server.

32. The computer program product of claim 29, wherein the text-based format comprises voice extensible markup language (VXML) format.

33. The computer program product of claim 29, further comprising computer readable program code that is configured to store information associated with serving the advertisement to the user.

34. The computer program product of claim 29, further comprising computer readable program code that is configured to determine if a user listened to the advertisement in its entirety.

35. The computer program product of claim 29, further comprising computer readable program code that is configured to determine how many times the user listened to the advertisement.

36. An advertising server that integrates interactive advertising within user-requested Web content, the advertising server comprising:

means for selecting a plurality of aggregated advertisements having a format and size compatible with the user-requested Web content when the user-requested Web content is converted to an audio format for insertion within Web content, in response to the subject matter of the Web content, requested by a user via a client device in communication with a Web server, wherein the advertisement has a text-based format and is configured to be interactive when converted to an audio format, wherein the means for selecting the plurality of aggregated advertisements having a format and size compatible with the user-requested Web content comprises means for retrieving the plurality of aggregated advertisements having a predetermined time length when delivered in an audio format;

means for forwarding the selected advertisement to the Web server for insertion within the Web content requested by the user;

means for receiving notification from a text-to-speech transcoder that the selected advertisement has been delivered to the user client device in an audio format;

means for storing information associated with delivery of the advertisement to the user client device; and means for storing information associated with user interaction with the advertisement.

37. The advertisement server of claim 36, further comprising means for providing additional information associated with the advertisement to the user client device in response to user interaction with the advertisement.

38. The advertisement server of claim 36, wherein the text-based format comprises voice extensible markup language (VXML) format.

* * * * *

UNITED STATES PATENT AND TRADEMARK OFFICE
CERTIFICATE OF CORRECTION

PATENT NO.       : 7,653,748 B2  
APPLICATION NO.  : 09/922348  
DATED            : January 26, 2010  
INVENTOR(S)      : Borger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 956 days.

Signed and Sealed this

Twenty-eighth Day of December, 2010

David J. Kappos  
*Director of the United States Patent and Trademark Office*